(12) United States Patent
Gherrou et al.

(10) Patent No.: US 9,382,140 B2
(45) Date of Patent: Jul. 5, 2016

(54) METHOD FOR REDUCING CHROMIUM

(71) Applicant: METAFIX INC., Lachine (CA)

(72) Inventors: Abdelaziz Gherrou, Lasalle (CA); John Riviere, Lachine (CA)

(73) Assignee: METAFIX INC., Lachine QC (CA)

( * ) Notice: Subject to any disclaimer, the term of this patent is extended or adjusted under 35 U.S.C. 154(b) by 115 days.

(21) Appl. No.: 14/361,458

(22) PCT Filed: Dec. 3, 2012

(86) PCT No.: PCT/CA2012/001113
§ 371 (c)(1),
(2) Date: May 29, 2014

(87) PCT Pub. No.: WO2013/078553
PCT Pub. Date: Jun. 6, 2013

(65) Prior Publication Data
US 2014/0353258 A1    Dec. 4, 2014

Related U.S. Application Data

(60) Provisional application No. 61/565,769, filed on Dec. 1, 2011.

(51) Int. Cl.
*C02F 1/70* (2006.01)
*C02F 1/66* (2006.01)
(Continued)

(52) U.S. Cl.
CPC ............... *C02F 1/70* (2013.01); *C01G 37/003* (2013.01); *C02F 1/66* (2013.01); *C02F 2101/22* (2013.01); *C02F 2209/04* (2013.01); *C02F 2209/06* (2013.01)

(58) Field of Classification Search
CPC .............. C02F 1/66; C02F 1/70; C02F 1/705; C02F 1/727; C02F 1/74; C02F 2101/22; C02F 2209/04; C02F 2209/06; C01G 37/003
See application file for complete search history.

(56) References Cited

U.S. PATENT DOCUMENTS 5,900,041 A   5/1999   Riviere et al.
6,043,022 A   3/2000   Lueking et al.
(Continued)

FOREIGN PATENT DOCUMENTS

CA   1214580   11/1986
CA   2050201   3/1992
(Continued)

OTHER PUBLICATIONS

ISR of corresponding PCT Application PCT/CA2012/001113.
(Continued)

*Primary Examiner* — Lucas Stelling
(74) *Attorney, Agent, or Firm* — Norton Rose Fulbright Canada LLP

(57) ABSTRACT

The present invention relates to method and a system of reducing chromium (VI) from a chromium bearing solution. The reduction of the chromium (VI) is achieved by contacting the chromium bearing solution which comprises chromium (VI) ions in an aqueous solution with iron fibers in an exchange mass under oxidation-reduction potential conditions at a pH of at least 2.5, with entry of iron ions into solution in the aqueous solution and reduction of the chromium (VI) ions to chromium (III) recovered in the exchange mass. A solution substantially free of chromium (VI) ions and total chromium is produced and discharged from the exchange mass.

7 Claims, 2 Drawing Sheets

(51) Int. Cl.
*C01G 37/00* (2006.01)
*C02F 101/22* (2006.01)

(56) References Cited

U.S. PATENT DOCUMENTS

| | | | | |
|---|---|---|---|---|
| 2006/0006122 | A1* | 1/2006 | Burns | C02F 1/008 210/758 |
| 2007/0278159 | A1* | 12/2007 | Ghosh | C02F 1/705 210/749 |
| 2011/0017671 | A1* | 1/2011 | Alley, Jr. | C02F 1/705 210/662 |

FOREIGN PATENT DOCUMENTS

| | | |
|---|---|---|
| CN | 202542976 U | 11/2012 |
| JP | 2000237768 A | 9/2000 |

OTHER PUBLICATIONS

Gheju, M. et al., "Hexavalent chromium reduction with scrap iron in continuous-flow system: Part 1: Effect of feed solution", Jourbal of Hazardous Materials, 2008, vol. 153, pp. 655-662.

* cited by examiner

FIG_1

METHOD FOR REDUCING CHROMIUM

CROSS-REFERNCE TO RELATED APPLICATIONS

This application is a National entry of PCT/CA2012/001113 filed Dec. 3, 2012, in which the United States of America was designated and elected, and which remains pending in the International phase until Jun. 1, 2014, which application in turn claims priority under 35 USC 119(e) from U.S. Provisional Application Ser. No. 61/565,769, filed Dec. 1, 2011.

The development of the present invention was made in collaboration with the <<Centre des technologies de l'eau>> (Centre of Water Technologies) in Montreal; www.cteau.com.

FIELD OF THE INVENTION

This invention relates to a process and a system for reducing chromium. Particularly, the invention relates to a process and a system for reducing chromium (VI) from a chromium bearing solution.

BACKGROUND OF THE INVENTION

Chromium is a metal used in a variety of industries such as tanneries, metallurgy and metal electroplating. Although chromium oxidation states range from (−IV) to (+VI), only the (+III) and (+VI) are stable in the environment. Chromium (VI) exists as oxyanions of chromate at pH higher than 6.5 and as dichromate at pH below 6.5. Chromium (VI) is very soluble in water. However, chromium (III) has a very lower solubility in water and readily precipitates as $Cr(OH)_3$ or as mixed Fe(III)-Cr(III) (oxy)hydroxides under alkaline or slightly acidic conditions. Chemical reduction of chromium (VI) to chromium (III) followed by precipitation, adsorption, ion exchange and membrane processes are the most used techniques at an industrial scale for the decontamination of chromium bearing solution containing chromium (VI) ions. Recent methods disclosed the reduction of chromium (VI) to chromium (III) using scrap iron fibres.

However, none of these methods provide a yield and a rate of chromium (VI) reduction high enough to be applicable at an industrial scale.

The problems with these methods are: The kinetics of the reduction of chromium (VI) to chromium (III) is slow under the conditions described therein; The chromium (III) produced from the reduction of chromium (VI) does not precipitate in the exchange mass because of the lack of process control, especially the pH adjustment to specific values; and the RedOx reaction between iron particles from the iron fibres and the chromium (VI) available in the chromium bearing solution is not controlled.

SUMMARY OF THE INVENTION

In accordance with one aspect of the present invention, there is provided a method of reducing chromium (VI) from a chromium bearing solution comprising: contacting the chromium bearing solution which comprises chromium (VI) ions in an aqueous solution with iron fibres in an exchange mass under oxidation-reduction potential conditions at a pH of at least 2.5, with entry of iron ions into solution in the aqueous solution and reduction of the chromium (VI) ions to chromium (III) recovered in the exchange mass; and discharging a solution from the exchange mass substantially free of chromium (VI) and total chromium ions.

In accordance with another aspect of the method herein described, the exchange mass further comprises a particulate inert substrate co-mingled and interlocking with the iron fibres.

In accordance with yet another aspect of the method herein described, the particulate inert substrate is selected from the group consisting of cellulosic fibres, synthetic fibres and particles of sponge material.

In accordance with still another aspect of the method herein described, the oxidation-reduction potential conditions are by an oxidant.

In accordance with yet still another aspect of the method herein described, the oxidant is oxygen gas.

In accordance with yet a further aspect of the method herein described, the pH is continuously adjusted between 2.5 and 4.

In accordance with still a further aspect of the method herein described, the discharged solution from the exchange mass has less than 0.05 ppm of chromium (VI) and total chromium ions.

In accordance with yet still a further aspect of the method herein described, the discharged solution from the exchange mass has less than 0.01 ppm of chromium (VI) and total chromium ions.

In accordance with another aspect of the present invention, there is provided a system for reducing chromium from a chromium bearing solution, the system comprising:
 a) at least one column defining:
  i) an inlet and an outlet separated by a flow chamber for the chromium bearing solution, and
  ii) an exchange mass in the flow chamber between the inlet and the outlet, the exchange mass comprising iron fibres;
 b) a first probe disposed proximal the inlet for monitoring a pH of the chromium bearing solution;
 c) a second probe proximal the inlet for monitoring an oxidation/reduction potential of the chromium bearing solution; and
 d) a controller assembly operatively connected to the probes receiving the pH and the oxidation/reduction potential of the chromium bearing solution, the controller assembly adjusting the pH and the oxidation/reduction potential of the chromium bearing solution in the exchange mass thereby reducing chromium (VI) ions to chromium (III) and producing a solution substantially free from chromium ions.

In accordance with another aspect of the system herein described, the monitoring the oxidation/reduction potential is by monitoring an oxidant concentration.

In accordance with yet another aspect of the system herein described, the oxidant is oxygen.

In accordance with still another aspect of the system herein described, the exchange mass further comprises a particulate inert substrate co-mingled and interlocking with the iron fibres.

In accordance with yet still another aspect of the system herein described, the particulate inert substrate is selected from the group consisting of cellulosic fibres, synthetic fibres and particles of sponge material.

In accordance with a further aspect of the system herein described, the system further comprises a reservoir for receiving the chromium bearing solution, the reservoir in connected to the column inlet.

In accordance with another aspect of the system, the system further comprises a third probe proximal the outlet for monitoring the pH of the solution substantially free from total chromium ions.

In accordance with yet another aspect of the system, the second probe proximal the inlet is an oxygen probe for monitoring an oxygen concentration in the chromium bearing solution when oxygen is used as the oxidant; and a conductivity meter for monitoring the conductivity of the chromium bearing solution.

The term "total chromium" means the amount of chromium in all valence states including chromium (VI) and chromium (III). The terms "substantially free" of chromium (IV) and total chromium ions, are understood as less than 0.01 ppm and less than 0.02 ppm respectively.

DETAILED DESCRIPTION OF THE INVENTION

Figure 1:
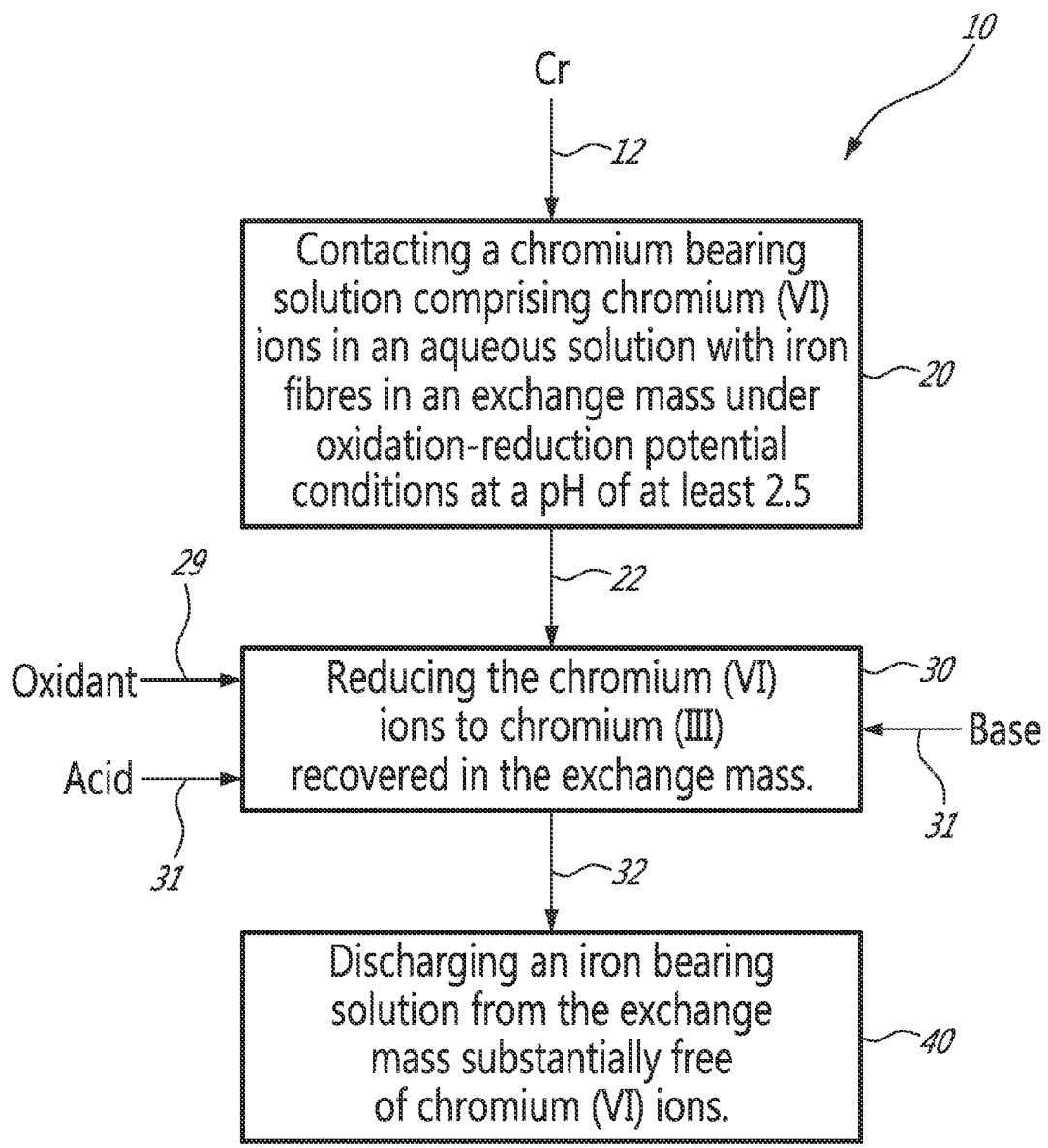
FIG. 1; illustrates a block diagram of the method for reducing chromium (VI) according to one embodiment of the present invention.

The present application reduces the aforesaid difficulties and disadvantages of the yield and the rate of the chromium reduction reaction by providing a method 10 of reducing chromium (VI) from a chromium bearing solution. As shown in FIG. 1, the method comprises contacting 20 the chromium bearing solution 12 which comprises chromium (VI) ions in an aqueous solution with iron fibres in an exchange mass under oxidation-reduction potential conditions at a pH of at least 2.5, with entry of iron ions into solution in the aqueous solution and reduction 30 of the chromium (VI) ions to chromium (III). The chromium (III) and Iron (III) are recovered in the exchange mass. A solution substantially free of total chromium ions is produced and discharged 40 from the exchange mass. Neither complete reduction of chromium (VI) to chromium (III) in the exchange mass nor effluent containing no chromium are known.

This new method 10 is based on a surprising finding that contacting a chromium bearing solution comprising chromium (VI) ions with iron fibres in a mass exchanger under oxidation-reduction potential conditions by addition of an oxidant 29 at a pH of at least 2.5 via addition of acid or a base 31 produces a solution 32 which has the advantage of having a chromium concentration below the detection level of the instrument used for chromium (VI) and total chromium monitoring. This new method is advantageously interesting because of the known harmful effects of chromium in human which are attributed primarily to the chromium (VI); chromium (III) being considered non-toxic. A single oral dose of 10 mg/kg body weight of chromium (VI) will result in liver necrosis, nephritis, and death in humans. A lesser dose will cause irritation and corrosion of the gastrointestinal mucosa and occasionally encephalitis and enlarged liver.

The present inventors have observed that the reduction reaction of chromium (VI) to chromium (III) is pH dependent. The reduction of chromium (VI) to chromium (III) is optimal at a pH close to 2.5 although the formation of chromium (III) ions is predominant at pH below 4. This is explained by the fact that when the pH is below 2.5, the iron fibres are oxidized under the strong acidic conditions, thereby decreasing the amount of iron fibres available for the chromium reduction reaction.

However, when treating continuously high volumes of chromium bearing solution containing chromium (VI), the present inventors have observed that, even if the initial pH of the chromium bearing solution is kept close to pH 2.5, the efficacy of the chromium (III) precipitation decreases progressively as the pH of the solution at the outlet of the iron fibres column decreases to a pH value close to the chromium bearing solution initial pH value.

The present inventors have found that when the chromium bearing solution is contacted with the iron fibres, the pH increases by 2 to 4 units depending on the initial pH of the chromium bearing solution. This phenomenon is more accentuated during the passage of the first volumes of chromium bearing solution in the iron fibres column. Without being bound by theory, it is believed that the reaction mechanism is surprisingly not governed by reactions (1) and (2), but rather by a release of Fe(II) and OH$^-$ ions due to an oxidation reaction of iron particles as shown in reaction (3), then chromium (VI) is reduced to chromium (III) as shown in reaction (2).

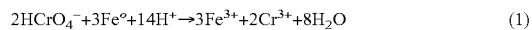

$$2HCrO_4^- + 3Fe° + 14H^+ \rightarrow 3Fe^{3+} + 2Cr^{3+} + 8H_2O \quad (1)$$

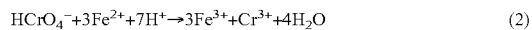

$$HCrO_4^- + 3Fe^{2+} + 7H^+ \rightarrow 3Fe^{3+} + Cr^{3+} + 4H_2O \quad (2)$$

$$2Fe° + O_2 + 2H_2O \rightarrow 2Fe^{2+} + 4OH^- \quad (3)$$

As shown in equation (2), an increase of the pH value helps the precipitation of Cr(III) and Fe(III). It was also observed that progressively, the precipitating Cr(III) and Fe(III) ions sediment out in the column and reduces the active area of the iron particles. The pH of the solution 32 at the outlet of the column increases slowly by less than one unit. Iron in solution present as Fe(III) precipitates at a pH of about 2.2. When a pH of 3.2 is reached, all of the dissolved Fe(III) is essentially precipitated. Chromium present in solution as chromium (III) precipitates at a pH about 4.5, preferably 5, and reaches a maximum precipitation at pH 8.5 (100% precipitation).

The present inventors have also found that the reduction of chromium (VI) to chromium (III) was improved by increasing the rate of iron oxidation reaction, Fe° → Fe$^{2+}$ + 2e$^-$. This is done by varying the oxidation-reduction potential of the chromium (VI) solution by an addition of oxidant such as ozone, oxygen, hypochlorite, calcium hypochlorite, persulphates, permanganates or hydrogen peroxide. In a preferred embodiment, the oxidant is oxygen. Unlike strong acidic conditions which consume the iron fibres, the addition of the oxidant, for example oxygen, enhances the iron oxidation reaction and increase the pH at the same time according to reaction (3). According to the stoichiometry of reaction (2), each mole of chromium (VI) requires 3 moles of iron (II). According to reaction (2) and (3), 1 mg of chromium (VI) requires 0.9 mg of oxygen.

In one embodiment, the chromium (III) is precipitated in the column during the process by continuously adjusting the pH of the chromium bearing solution above a pH of 4.0. In a preferred embodiment, the pH is continuously adjusted between 2.5 and 4 such that the pH of the solution at the outlet is above 5. This pH adjustment is dependent on the volume of chromium bearing solution treated. When the chromium bearing solution is contacted with the iron fibres in the column, the pH increases and after a certain volume of chromium bearing solution treated, the pH stabilises at a value slightly equal to the initial value of the chromium (VI) bearing solution or increases more slowly.

Tables 1a and 1b illustrate the effect of the pH on the reduction of chromium in chromium bearing solution. More specifically, it is shown in Table 1b that keeping the rinse wastewater's pH between 4 and 5 increases drastically the efficiency of chromium (VI) reduction to chromium (III) and the precipitation of chromium (III) generated during the process. The lifetime of the column is also increased. Values of ppm in the Tables are equivalent to mg/L.

TABLE 1 effect of the pH on the reduction of chromium in chromium bearing solution, at the inlet of the column vs. at the outlet of the column.

| Wastewater volume (liters) | Inlet of column | | | Outlet of column | | |
|---|---|---|---|---|---|---|
| | pH | [Cr(VI)] (ppm) | [Cr(total)] (ppm) | pH | [Cr(VI)] (ppm) | [Cr(total)] (ppm) |
| a) without pH adjustment | | | | | | |
| 400 | 3.4 | 12.8 | 29 | 6.2 | <0.01 | <0.02 |
| 2000 | 3.3 | 7.2 | 11.6 | 5.2 | <0.01 | <0.02 |
| 4000 | 3.5 | 9.8 | 17 | 5.5 | <0.01 | <0.02 |
| 5500 | 3.5 | 11.8 | 20 | 5.4 | <0.01 | <0.02 |
| 6800 | 3.4 | 11.5 | 22 | 5.3 | <0.01 | <0.02 |
| 7200 | 3.4 | 13 | 29 | 5.6 | <0.01 | <0.02 |
| 7600 | 3.6 | 8 | 16 | 5.2 | <0.01 | <0.02 |
| 8300 | 3.3 | 7.9 | 17.5 | 5.0 | <0.01 | <0.02 |
| 9000 | 3.4 | 14 | 28.8 | 5.6 | <0.01 | <0.02 |
| 9500 | 3.5 | 12.5 | 22 | 5.3 | <0.01 | <0.02 |
| 10100 | 3.5 | 7.6 | 15 | 5.4 | <0.01 | <0.02 |
| 10800 | 3.4 | 9.3 | 21 | 5.1 | <0.01 | <0.02 |
| 11150 | 3.4 | 11 | 27 | 5.3 | <0.01 | <0.02 |
| 11719 | 3.4 | 8 | 25 | 5.2 | <0.01 | <0.02 |
| 12308 | 2.8 | 6 | 13.42 | 3.5 | 2.6 | 3.2 |
| 13486 | 3.4 | 4.6 | 13.5 | 4.3 | 2.2 | 3.6 |
| 13546 | 3.5 | 2.5 | 5 | 4.2 | 2.3 | 3.7 |
| 13692 | 3.8 | 6.2 | 16.3 | 4.7 | 0.2 | 0.6 |
| 13960 | 3.6 | 6.2 | 16 | 4.6 | 0.2 | 0.8 |
| 14500 | 4.1 | 17.2 | 28.8 | 3.6 | 6.0 | 12 |
| 15800 | 3.5 | 19.7 | 24.4 | 4.2 | 6.5 | 13 |
| 17300 | 4.1 | 13 | 23.5 | 5.2 | 5.3 | 12 |
| 18500 | 4.5 | 12.5 | 22 | 5.0 | 6.2 | 12.5 |
| 19330 | 4.1 | 13 | 23.5 | 5.2 | 5.4 | 11.2 |
| 19960 | 4.4 | 7.2 | 14 | 4.7 | 2.6 | 4.8 |
| 19986 | 3.1 | 8.8 | 20 | 4.5 | <0.01 | <0.02 |
| 20542 | 3.1 | 8.8 | 17.1 | 4.3 | 2.2 | 3.8 |
| 20582 | 3.2 | 7.5 | 18 | 4.6 | <0.01 | <0.02 |
| 21220 | 3.8 | 9.6 | 16.5 | 4.7 | 0.2 | 1.2 |
| 22192 | 3.8 | 5.6 | 10.8 | 4.3 | 4 | 9.5 |
| 22491 | 3.8 | 8 | 14.6 | 4.3 | 4 | 11.11 |
| 22896 | 3.2 | 20 | 45 | 3.5 | 13 | 14.5 |
| 23011 | 3.2 | 22 | 46 | 3.4 | 12 | 15.2 |
| b) with pH adjustment | | | | | | |
| 156 | 3.5 | 10.4 | 18.5 | 5.0 | <0.01 | <0.02 |
| 456 | 3.4 | 6 | 12 | 5.2 | <0.01 | <0.02 |
| 896 | 3.5 | 7 | 14.3 | 5.2 | <0.01 | <0.02 |
| 1520 | 3.6 | 9.2 | 21 | 5.3 | <0.01 | <0.02 |
| 2240 | 3.4 | 7.8 | 18 | 5.3 | <0.01 | <0.02 |
| 3300 | 3.5 | 5.6 | 14 | 5.6 | <0.01 | <0.02 |
| 4560 | 3.5 | 8.6 | 20.5 | 5.4 | <0.01 | <0.02 |
| 6500 | 3.4 | 7.8 | 17 | 5.0 | <0.01 | <0.02 |
| 7100 | 3.2 | 8.8 | 20.3 | 5.2 | <0.01 | <0.02 |
| 8890 | 3.6 | 8 | 16 | 5.4 | <0.01 | <0.02 |
| 11250 | 3.4 | 12 | 15.2 | 5.3 | <0.01 | <0.02 |
| 13500 | 3.4 | 7 | 13.6 | 5.0 | <0.01 | <0.02 |
| 15600 | 3.5 | 8.3 | 14 | 4.8 | <0.01 | <0.02 |
| 17620 | 3.5 | 8.6 | 18 | 4.8 | <0.01 | <0.02 |
| 22000 | 3.3 | 9 | 19.9 | 4.8 | <0.01 | <0.02 |
| 23540 | 3.2 | 11 | 23 | 5.0 | <0.01 | <0.02 |
| 25600 | 3.8 | 7.3 | 15 | 5.1 | <0.01 | <0.02 |
| 26650 | 3.5 | 7.9 | 18 | 5.3 | <0.01 | <0.02 |
| 28360 | 3.6 | 8.3 | 19 | 5.4 | <0.01 | <0.02 |
| 30300 | 3.3 | 5 | 11 | 5.2 | <0.01 | <0.02 |
| 32000 | 3.4 | 9 | 20 | 4.8 | <0.01 | 0.022 |
| 34500 | 3.5 | 12 | 26 | 4.9 | <0.01 | 0.11 |
| 36780 | 3.7 | 11.6 | 22 | 5.2 | <0.01 | 0.21 |
| 39450 | 3.8 | 15 | 23 | 5.0 | <0.01 | <0.02 |

TABLE 1-continued effect of the pH on the reduction of chromium in chromium bearing solution, at the inlet of the column vs. at the outlet of the column.

| Wastewater volume (liters) | Inlet of column | | | Outlet of column | | |
|---|---|---|---|---|---|---|
| | pH | [Cr(VI)] (ppm) | [Cr(total)] (ppm) | pH | [Cr(VI)] (ppm) | [Cr(total)] (ppm) |
| 40200 | 3.5 | 16 | 25 | 5.3 | <0.01 | <0.02 |
| 43600 | 3.4 | 8 | 18 | 5.2 | <0.01 | <0.02 |
| 46694 | 3.5 | 6.3 | 11.6 | 5.4 | <0.01 | 0.22 |
| 48600 | 3.6 | 7.9 | 18 | 5.3 | <0.01 | 0.2 |
| 51200 | 3.7 | 8.6 | 17 | 5.0 | <0.01 | 0.8 |
| 55000 | 3.3 | 8.6 | 19 | 4.8 | <0.01 | <0.02 |
| 57600 | 3.7 | 9 | 22 | 4.8 | <0.01 | 0.065 |
| 60200 | 3.5 | 8.8 | 19.6 | 4.8 | <0.01 | <0.02 |
| 64300 | 3.5 | 9.3 | 22 | 5.0 | <0.01 | <0.02 |
| 66540 | 3.5 | 5.6 | 12 | 5.1 | <0.01 | 0.11 |
| 68900 | 3.5 | 4.3 | 9 | 5.3 | <0.01 | 0.44 |
| 71360 | 3.7 | 11.6 | 22 | 5.4 | <0.01 | 0.6 |
| 75000 | 3.8 | 7 | 15 | 5.2 | <0.01 | 0.45 |
| 78600 | 3.5 | 8.2 | 18 | 4.8 | <0.01 | 0.2 |
| 80210 | 3.5 | 8 | 16 | 4.9 | <0.01 | 0.03 |
| 83500 | 3.5 | 8.9 | 20 | 5.2 | <0.01 | 0.32 |
| 85000 | 3.6 | 11.3 | 23 | 5.0 | <0.01 | 0.44 |

In Table 1b, the raise of the total chromium concentration at the outlet of the column after the treatment of 51200 litres of wastewater maybe explained by the inevitable phenomenon of sedimentation of the precipitating Cr(III) and Fe(III) ions out in the column which reduces the active area of the iron particles. It is of note that these experiments were done without addition of an oxidant. However, these total chromium concentration results are still below the standards acceptable to most jurisdictions. The total chromium standards in the Applicant's jurisdiction are less than 5 ppm. The standards for chromium (VI) are less than 2.5 ppm.

Table 2 illustrates the reduction of chromium (VI) from a chromium bearing solution in the exchange mass of the column. In the present case rinse water coming from an electroplating factory is used. This rinse water initially contains 23 ppm of chromium (VI) and 48 ppm of chromium total and has an initial pH of 3.57.

TABLE 2 evolution of the chromium (VI) concentration in the solution at the outlet of the iron fibres column at 4 different oxygen concentrations.

| Volume of wastewater (ml) | [O2] (mg/L) | | | |
|---|---|---|---|---|
| | 9.3 | 15 | 22 | 27 |
| | [Cr(VI)] (mg/L) | | | |
| 100 | 2.2 | 1.2 | 0.22 | 0.10 |
| 200 | 4.3 | 3.2 | 1.2 | 0.12 |
| 300 | 5.25 | 3.6 | 2.75 | 0.21 |
| 400 | 5.9 | 4.3 | 2.5.2 | 0.12 |
| 500 | 7.75 | 4.8 | 2.4 | 0.03 |
| 600 | 7.96 | 4.9 | 2.2 | <0.01 |
| 700 | 9.5 | 5.2 | 1.75 | <0.01 |
| 800 | 9.6 | 5.2 | 1.85 | <0.01 |
| 900 | 9.5 | 5.3 | 2.02 | <0.01 |
| 1000 | 9.5 | 5.2 | 2.01 | <0.01 |

Table 2 also illustrates the effect of the oxygen concentration in the rinse water. When the concentration of oxygen increases, the chromium (VI) concentration at the outlet of the column in the solution decreased drastically to reach values below the detection level of the instrument used for chromium (VI) and total chromium monitoring, preferably less than 0.05 ppm, most preferably less than 0.01 ppm. This means that the addition of oxygen highly enhances the efficiency of the process of chromium (VI) reduction with iron fibres in the column. When oxygen concentration is low, the reaction (3) does not produce enough electrons to reduce all the chromium (VI) available in the chromium bearing solution especially when the chromium concentration is high. In one embodiment, the concentration of oxygen can be adjusted in accordance with the concentration of chromium (VI) at the inlet of the iron fibres column. Therefore a high surface area resin, with careful oxidant and pH control are required for complete chromium (VI) to chromium (III) conversion.

Figure 2:
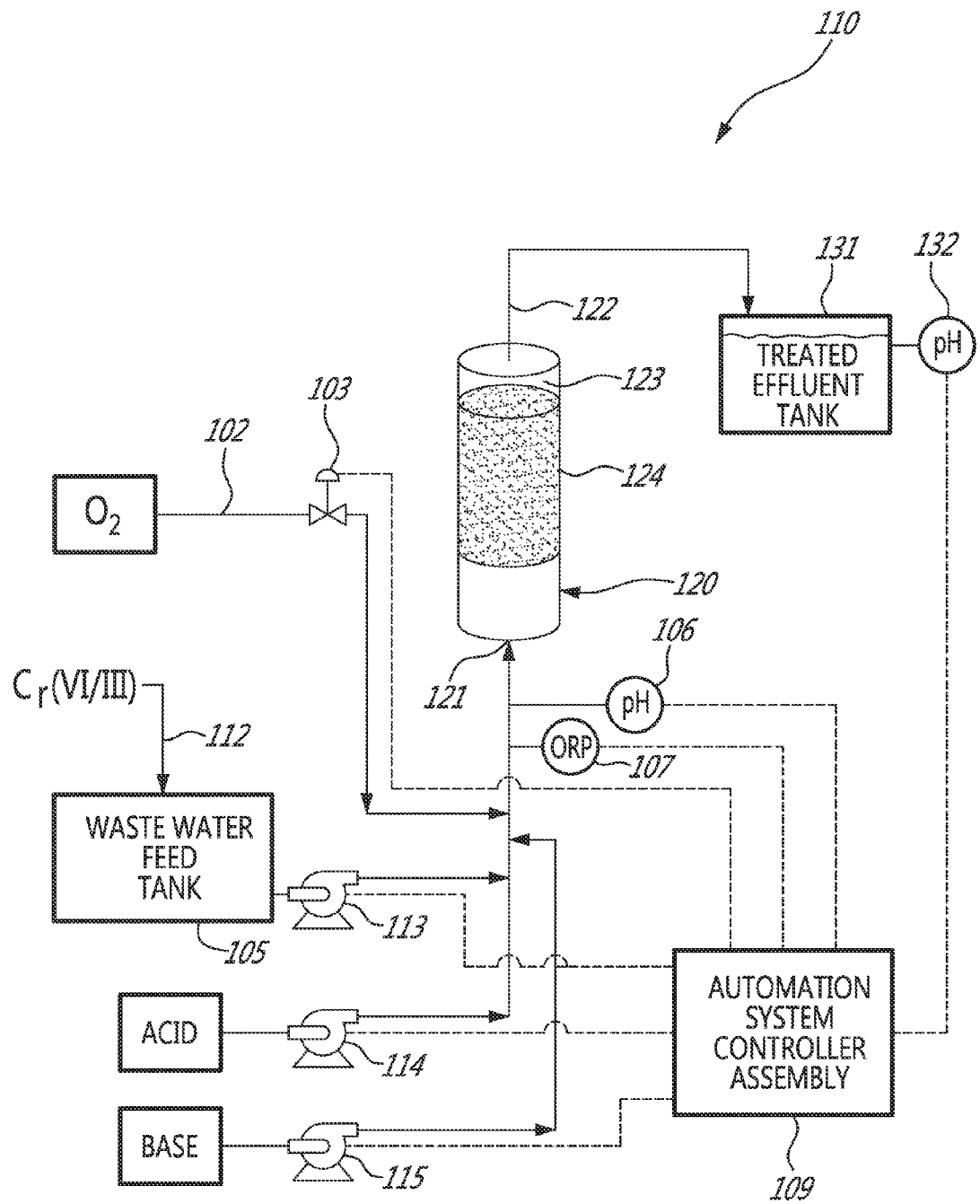
FIG. 2 is a schematic view of a system for reducing chromium (VI) from a chromium bearing solution in accordance with an embodiment.

Turning now to FIG. 2, the present invention also provide an system 110 for reducing chromium (VI) from a chromium bearing solution wastewater feed tank 105. The system 110 comprises at least one column 120, the column defining an inlet 121 and an outlet 122 separated by a flow chamber 123 for the chromium bearing solution, and an exchange mass 124 held within the flow chamber 123 between the inlet 121 and the outlet 122, the exchange mass 124 comprising iron fibres similar to those of U.S. Pat. No. 5,900,041 herein incorporated by reference; a first probe 106 disposed proximal the inlet 121 for monitoring a pH of the chromium bearing solution 112; a second probe 107 proximal the inlet 121 for monitoring an oxidation/reduction potential of the chromium bearing solution; and a controller assembly 109 operatively connected to the probes receiving the pH and the oxidation/reduction potential of the chromium bearing solution. The controller assembly 109 adjusting the pH and the oxidation/reduction potential of the chromium bearing solution in the exchange mass 124 thereby reducing chromium (VI) ions to chromium (III) and producing a solution substantially free from chromium (VI) ions. The chromium (III) and Iron (III) ions precipitate in the exchange mass 124. Control can be achieve by monitoring a variety of parameters including either outlet pH via probe 132. That can be located in treated effluent tank 131. Oxidant 102 input may be dosed into the system 110 via control valve 103. pH control may be achieved via acid/base addition with pumps 114/115. Wastewater pump 113 may also be controlled.

In one embodiment, the system further comprises a third probe disposed proximal the outlet for monitoring a pH of the solution. The controller assembly adjusts the value of the chromium bearing solution to a value between 2.5-4.5 depending on the value of the solution at the outlet 122 such that at any time, the pH of the solution at the outlet 122 is higher than 4.5.

In another embodiment not shown, the second probe 107 proximal the inlet 121 maybe replaced by an oxygen probe for monitoring an oxygen concentration in the chromium bearing solution when oxygen is used as the oxidant; and a conductivity meter for monitoring the conductivity of the chromium bearing solution.

The controller assembly comprises reservoirs, pumps and hoses needed to circulate an acid and/or a base for pH adjustment of the chromium bearing solution.

In one embodiment not shown, the system 110 comprises two columns 120 in series, wherein one of the two column 120 is a primary column; one of the two column is a secondary column; and the controller assembly 109 provides notification when the primary column is exhausted and the secondary column is now treating the chromium bearing solution. In another embodiment not shown, the system 110 comprises two columns 120. One of the two column 120 is a primary column; one of the two column is a secondary column. The primary column is placed in series with and upstream from the secondary column and both columns are treating the chromium bearing solution at the same time.

In one embodiment, the exchange mass comprises the iron fibres in elongate particle form. In an alternate embodiment, the exchange mass comprises the iron fibres in elongate particle form and a particulate inert substrate. The substrate particles and the iron fibres particles are co-mingled and interlock with the iron particles dispersed throughout the mass of substrate particles.

The body of substrate particles retains its integrity and does not collapse, i.e., non-collapsing, as the iron fibres are consumed.

The exchange mass is packed in the flow chamber of the column to provide a packing in the column which is permeable to the chromium bearing solution containing the chromium (VI) ions. The compressible exchange mass is compressed in the flow chamber to provide a packing with a level of permeability to permit flow of the chromium bearing solution through the packing while providing a retention time of the chromium bearing solution in the packing to allow efficient reduction of chromium (VI) ions in the solution by the iron fibres of the exchange mass.

If the degree of compression of the exchange mass is too great the resultant packed mass will not have sufficient permeability to liquid flow; if the mass is not compressed, or the compression is insufficient, there will be gaps in the mass so that the contact time is not sufficient to allow efficient reduction of chromium (VI) ions and recovery of chromium (III) will not be achieved.

In one embodiment, the exchange mass comprises 100% by weight of the iron fibres particles. In another embodiment, the exchange mass suitably comprises 70 to 99%, by weight, of the iron fibres particles and 1 to 30%, by weight of the substrate to a total of 100%, based on the weight of the exchange mass.

In one embodiment, suitable inert, particulate substrates include cellulosic fibres synthetic fibres and particles of synthetic or natural sponge. Suitable cellulosic fibres include cellulosic paper fibre. Such fibre may be virgin paper fibre or may be recycled paper fibre derived from the recycling of paper products. Suitable synthetic fibres include polyethylene, polyester and polyamide, for example, nylon fibres. The fibres typically are present in a random non-aligned arrangement, rendering the mass of fibres porous or permeable to liquid flow, the mass of fibres providing random flow paths for flow of the liquid. The permeability or porosity of the exchange mass may be adjusted by the relative ratio of the components and by compression of the mass.

Suitable sponge material includes synthetic compressible sponges, for example, polyurethane sponge, in a particle form in which the sponge is shredded or chopped into small portions while retaining the sponge structure which is characterized by a plurality of open pores or cells. As in the case of the fibres random flow paths are formed between the particles of sponge and between the open cells in the sponge and the permeability of the mass of sponge particles can be adjusted by the relative ratio of the components and an appropriate level of compression.

In one embodiment the particles of iron fibres are iron or steel. In one embodiment, the iron fibres are steel wool in a chopped form which results in elongate particles or strands. Suitable elongate steel wool strands have an average diameter of 0.1 to 0.2 mm, preferably 0.125 to 0.175 mm, and an average length of 3 to 7 mm, preferably about 5 mm. These strands may be relatively straight, arcuately curved or curled.

In accordance with the experiments showed Tables 2a and b, the chromium bearing solution entering the inlet typically contains 2 to 22 ppm of chromium (VI) but may contain more or less chromium (VI); as the chromium bearing solution progresses in its travel through the exchange mass, the chromium (VI) is reduced with iron ions entering into solution to produce chromium (III), until the solution reaching the outlet has a chromium (VI) and total chromium content under the detection level of the instrument used for chromium (VI) and total chromium monitoring, preferably less than 0.05 ppm, most preferably less than 0.01 ppm. The iron ions precipitates also under pH condition of the chromium (VI) reduction in the exchange mass. The solution is discharged from the outlet is substantially free of chromium and iron.

Efficient reduction of chromium (VI) in chromium bearing solution is achieved in cartridges in which the flow chamber has a volume of 4,000 to 16,000 ml, employing a flow rate of solution of 100 to 125 ml/min. In general the flow rate may be 0.025 to 10,000 ml/min., preferably 1,000 to 3,000, more preferably about 2,000 ml/min. Efficient replacement has been achieved at a flow rate of 2,000 ml/min. which represents an especially practical flow rate.

Conveniently the cartridges may have flow chambers with a length: diameter ratio of 2:1 to 10:1. The cartridges are conveniently disposed vertically and the solution may be pumped into the cartridges or flow through the cartridges by gravity.

The cartridge housing is suitably a disposable item of plastic material. Conveniently the spent cartridge with its charge of precipitated chromium (III) maybe delivered to specialized companies for revalorization of the iron-chromium residue.

In operation, the system for reducing chromium from chromium bearing solution monitors the pH of the chromium bearing solution at the inlet of the column and the pH of the solution at the outlet of the column. The controller assembly adjusts the value of the chromium bearing solution to a value between 2.5-4.5 depending on the value of the solution at the outlet such that, at any time the pH of the solution at the outlet is higher than 4.5. The system also monitors the oxidation/reduction potential of the chromium bearing solution and adjusts the oxidant's concentration in accordance with the initial chromium concentration in the chromium bearing solution.

The invention claimed is:

1. A system for reducing chromium from a chromium bearing solution, the system comprising:
   a) at least one column defining:
      i) an inlet and an outlet separated by a flow chamber for the chromium bearing solution, and
      ii) an exchange mass in the flow chamber between the inlet and the outlet, the exchange mass comprising iron fibres;
   b) a first probe disposed proximal the inlet for monitoring a pH of the chromium bearing solution;
   c) a second probe proximal the inlet for monitoring an oxidation/reduction potential of the chromium bearing solution; and
   d) a controller assembly operatively connected to the probes receiving the pH and the oxidation/reduction potential of the chromium bearing solution, the controller assembly adjusting the pH and the oxidation/reduction potential of the chromium bearing solution in the exchange mass thereby reducing chromium (VI) ions to chromium (III) and producing a solution substantially free from chromium (VI) and total chromium ions.

2. The system of claim 1, wherein the monitoring the oxidation/reduction potential is by monitoring an oxidant concentration.

3. The system of claim 2, wherein the oxidant is oxygen.

4. The system of claim 1, wherein the exchange mass further comprises a particulate inert substrate co-mingled and interlocking with the iron fibres.

5. The system of claim 4, wherein the particulate inert substrate is selected from the group consisting of cellulosic fibres, synthetic fibres and particles of sponge material.

6. The system of claim 1, wherein the system further comprises a reservoir for receiving the chromium bearing solution, the reservoir in connected to the column inlet.

7. The system of claim 1, wherein the system further comprises a third probe proximal the outlet for monitoring the pH of the solution substantially free from total chromium ions.

* * * * *